United States Patent [19]

Winkelman

[11] Patent Number: 5,748,802
[45] Date of Patent: May 5, 1998

[54] METHOD AND APPARATUS FOR THE ANALYSIS AND CORRECTION OF THE IMAGE GRADATION IN IMAGE ORIGINALS

[75] Inventor: Kurt-Helfried Winkelman, Kiel, Germany

[73] Assignee: Linotype-Hell AG, Eschborn, Germany

[21] Appl. No.: 376,377

[22] Filed: Jan. 23, 1995

Related U.S. Application Data

[63] Continuation of Ser. No. 43,253, Apr. 6, 1993, abandoned.

[30] Foreign Application Priority Data

Apr. 6, 1992 [DE] Germany .................. 42 11 469.1
Mar. 26, 1993 [DE] Germany .................. 43 09 878.9

[51] Int. Cl.⁶ .................................................. G06K 9/38
[52] U.S. Cl. ................................... 382/271; 382/169
[58] Field of Search ........................... 382/169, 171, 382/172, 270, 271, 274

[56] References Cited

U.S. PATENT DOCUMENTS

| | | | |
|---|---|---|---|
| 4,411,015 | 10/1983 | Scherl et al. | 382/51 |
| 4,654,722 | 3/1987 | Alkofer | 358/522 |
| 4,972,257 | 11/1990 | Birnbaum et al. | 358/520 |
| 5,121,224 | 6/1992 | Ng et al. | 382/51 |
| 5,140,649 | 8/1992 | Kageyama | 382/51 |
| 5,222,154 | 6/1993 | Graham et al. | 358/522 |
| 5,239,378 | 8/1993 | Tsuji et al. | 382/169 |
| 5,315,389 | 5/1994 | Izawa et al. | 382/169 |

*Primary Examiner*—Yon J. Couso
*Attorney, Agent, or Firm*—Hill, Steadman & Simpson

[57] ABSTRACT

A method and apparatus for the analysis and correction of the image gradation of an image original to be reproduced by evaluating image values acquired by point-by-point and line-by-line, optoelectronic scanning with an input device in apparatus and systems for image processing. The image original is geometrically subdivided into a plurality of sub-images. The frequency distribution of the image values or, respectively, of the luminance components of the color values in a corresponding sub-image is separately identified as a sub-image histogram. The sub-image histograms of the individual sub-images are evaluated and the sub-images relevant for the image gradation are identified by means of the evaluation. An aggregate histogram that corresponds to the frequency distribution of the image values or, respectively, of the luminance component of the color values in the relevant sub-images is calculated from the sub-image histograms of the relevant sub-images. Correction values for the correction of the image gradation characteristic of the image original are subsequently calculated from the aggregate histogram according to the method of histogram modification.

26 Claims, 7 Drawing Sheets

SUB-IMAGE MATRIX

SUB-IMAGE MATRIX

HISTOGRAM

AGGREGATE-HISTOGRAM

METHOD AND APPARATUS FOR THE ANALYSIS AND CORRECTION OF THE IMAGE GRADATION IN IMAGE ORIGINALS

This is a continuation of application Ser. No. 08/043,253, filed Apr. 6, 1993, now abandoned.

BACKGROUND OF THE INVENTION

The invention generally relates to methods and apparatus for electronic reproduction of an image. More specifically, the invention is directed to a method and to an apparatus for the analysis and correction of the image gradation in image originals in apparatus and systems for electronic image processing. As used herein, the term "image originals" refers to and means black-and-white originals and color originals.

As is known, electronic image processing is essentially composed of the steps of image input, image processing and image output. Analysis of image gradation generally is undertaken during image processing for the acquisition of correction curves for the correction of image gradation characteristics to effect contrast corrections in image originals.

In the image input step with, for example, a color image scanner (scanner) as an image input device, three primary color value signals R, G, B are acquired by trichromatic as well as pixel-by-pixel and line-by-line scanning of color originals to be reproduced with an optoelectronic scanner element, whereby the individual color value triads represent the color components "red" (R), "green" (G) and "blue" (B) of the pixels scanned in the color original. The analog color values are converted into digital color values and are stored for the subsequent image processing.

In the image processing step, the colors R, G, B are usually first converted into color separation values C, M, Y, K according to the laws of subtractive color mixing, these color separation values C, M, Y, K being a measure for the dosages of the inks "cyan" (C), "magenta" (M), "yellow" (Y) and "black" (K) or, respectively, for the raster point sizes or raster percentages employed in the later printing process.

Over and above this, various image parameters such as light image values and dark image values for an adaptation of the image scope, color cast values for a color cast correction or a correction curve for a correction of over-exposures and under-exposures or for a contrast correction are additionally set. Further, local and selective color corrections can also be undertaken in color originals, with the goal of improving the image reproduction, compensating deficiencies or undertaking editorial changes.

The setting of the image parameters by an operator usually begins with the operator first pre-setting standard values that he determines based on a rough pre-classification of the corresponding image original or based on an experienced guess. While setting the image parameters, the operator makes use of the measuring functions of the image input device, in that he measures characteristic picture elements in the image original with the optoelectronic scanner element with respect to image scope, color cast and luminance distribution and employs the results for finding optimum setting values.

After the image processing step, the image output step is undertaken with a suitable image output device, for example, a color separation recorder (recorder) or printer for the rastered recording of color separations on a film material.

The interpretation of the measured results and their conversion into optimum setting values for the image gradation requires a great deal of experience and often presents an inexperienced operator with difficulties.

It is already known to undertake automatic analyses of the image gradation of image originals to be reproduced by evaluating image values of the image original and to employ the results of analysis for identifying image-dependent pre-setting values for the correction of the image gradation. The operator can evaluate the result of the image gradation analysis and can directly transfer the resulting pre-setting values into the image input device or can modify or correct them on the basis of measurement functions in order to undertake an optimum setting. The operator is thus relieved of routine jobs and can concentrate on the processing of image originals wherein additional global or selective color corrections are required for improving the reproduction quality.

The known methods for the analysis of image gradation of image originals are based on histogram modification methods with identification of image-critical regions of the image original based on high-pass filtering techniques.

In the histogram modification methods, the contrast changes are implemented on the basis of the frequency distribution (histogram) of the image values (for example, luminance values). A gradation characteristic (transformation characteristic) is generated from the histogram by an accumulation of the histogram values. The image values of an original image are resorted such via this gradation characteristic such that the histogram of the processed image assumes a defined path.

This procedure has the disadvantage that background and foreground regions low in structures and unimportant to the image unduly alter the course of the histogram and, thus, unduly alter the gradation correction as well. Before applying a histogram modification method, the image-critical foreground and background regions must therefore be separated from the image-insignificant regions of the image original.

In the methods for identifying image-critical regions of the original by high-pass filtering (LaPlace filtering or the like), however, only picture elements wherein the high-pass filter signal upwardly crosses a threshold are utilized for the calculation of the frequency distribution. This procedure, however, is extremely calculation-intensive and, thus, time consuming. Moreover, the identification of the frequency distribution from the edge information of the image is frequently unbeneficial.

The known methods for the analysis of the image gradation in image originals also have the further disadvantage that they do not allow any reliable identification of the optimum setting values for an optimally broad spectrum of image originals, so that no simple, fast and standardized parameterizations of image input devices are possible.

The known methods for image gradation analysis in color originals are based on the color values R, G, B of the device-dependent RGB color space acquired from the respective image input device. The analysis of the image scope and of the color cast are undertaken with direct reference to the color values R, G, B. A luminance signal derived from the color values R, G, B is frequently employed for the analysis of the image gradation.

It is therefore likewise considered disadvantageous that the known analysis methods must be respectively adapted to the properties of the color values R, G, B of the respective image input devices given the connection of different image devices.

The known analysis methods, moreover, are calculation-intensive, since the color values R, G, B acquired with the image input devices must be resolved into two color components for a color cast analysis and must also be resolved into a luminance component for an image scope analysis or an image gradation analysis.

SUMMARY OF THE INVENTION

The present invention provides improved methods and apparatus for analysis and correction of the image gradation in image originals (black-and-white originals, color originals) that work faster, more simply and more precisely than prior art methods and apparatus.

For this purpose, the invention provides that:

- an image original to be analyzed is geometrically subdivided into a plurality of sub-images;
- a frequency distribution of an image value, preferably a luminance component of color values, in a corresponding sub-image is separately identified in a sub-image histogram for every sub-image;
- the sub-image histograms of the individual sub-images are evaluated and sub-images critical to the image for image gradation are identified based on the evaluation;
- an aggregate histogram that corresponds to the frequency distribution of the image values, or, respectively, of the luminance component of the color values, in the image-critical sub-images is calculated from the sub-image histograms of the image-critical sub-images; and
- a correction curve for the correction of an image gradation characteristic of the image original for the purpose of contrast correction is calculated from the aggregate histogram according to a histogram modification method.

It is preferably provided that the evaluation of the sub-image histograms for the identification of the image-critical (structure-rich) sub-images takes place with the assistance of statistical histogram parameters.

It has proven expedient that the histogram parameter of "scatter", i.e., standard deviation (SDev), and the histogram parameter of "relative area proportion of the most frequent image values" (FLAnt) of a sub-image histogram are utilized for the evaluation of the sub-image histograms, whereby the histogram parameter of "scatter" (SDev) is a measure for the mean deviation of the image values from the average of the histogram distribution of the sub-images, and the histogram parameter of "relative area proportion of the most frequent image values" (FLAnt) is a measure for the structure in image regions of the sub-images.

The identification of the image-critical sub-images respectively occurs according to a classification pattern by comparing the histogram parameter of "scatter" (SDev) and the histogram parameter of "relative area proportion of the most frequent image values" (FLAnt) with thresholds (SwSDev, SwFLAnt) that are selectable for the image original.

In an embodiment of the invention, a sub-image is advantageously classified as image-critical according to a classification pattern when the value of the histogram parameter "scatter" (SDev) of the sub-image is greater than a previously prescribed threshold (SwSDev) and the value of the histogram parameter "relative area proportion of the most frequent image values" (FLAnt) of the sub-image is lower than the prescribed threshold (SwFLAnt).

In an embodiment of the invention, it is advantageous that the threshold (SwSDev) for the histogram parameter "scatter" (SDev) and/or the threshold (SwFLAnt) for the histogram parameter of "relative area proportion of the most frequent image values" (FLAnt) are respectively selected dependent on the properties of the image original.

In an embodiment of the invention, the threshold (SwSDev) for the histogram parameter of "scatter" (SDev) is calculated from the frequency distribution of the values of the histogram parameter of "scatter" (SDev).

In an embodiment of the invention, it has proven expedient to calculate the histogram parameter of "scatter" (SDev) and the histogram parameter of "relative area proportion of the most frequent image values" (FLAnt) of the sub-images by statistical evaluation of the corresponding sub-image histograms.

The histogram parameter of "scatter" (SDev) for a sub-image preferably is calculated by means of the following steps:

- calculating the plurality (N) of image values for the sub-image from the corresponding sub-image histogram (Hi(i), i, . . . , M) according to the following equation:

$$N = \sum_{i=1}^{M} H(i)$$

whereby (H(i)) corresponds to the plurality of picture elements having the image value (i) in the sub-image;

- calculating a mean of the frequency distribution from the sub-image histogram (Hi(i), i=1, . . . , M) according to the equation:

$$\text{Mean} = \frac{1}{N-1} \sum_{i=1}^{M} i * H(i)$$

calculating a variance (Var) according to the equation:

$$Var = \frac{1}{N-1} \sum_{i=1}^{M} (i - \text{Mean})^2 * H(i)$$

and identifying the histogram parameter of "scatter" (SDev) according to the equation:

$$SDev = \sqrt{Var} \ .$$

The histogram parameter of "relative area proportion of the most frequent image values" (FLAnt) for a sub-image is expediently calculated according to the following steps:

- calculating the plurality N of image values for the sub-image from the corresponding sub-image histogram (Hi(i), i=1, . . . , M) according to the following equation:

$$N = \sum_{i=1}^{M} H(i)$$

whereby (H(i)) corresponds to the plurality of picture elements having the image value (i) in the sub-image;

- resorting the histogram values (Hs(j)) of the corresponding sub-image histogram (H(i)) in descending order of the frequency to form a new frequency distribution (Hs(i));
- prescribing the plurality (n) of histogram values (Hs(i)) to be accumulated; and
- calculating the histogram parameter "relative area proportion of the most frequency image values" (FLAnt) according to the equation:

$$FLAnt(n) = \sum_{i=1}^{n} H_s(i)/N$$

It has also proven expedient to classify the sub-images sequences by means of the following steps:

- selecting the thresholds (SwSDev, SwFLAnt) for the histogram parameters of "scatter" (SDev) and of "relative area proportion of the most frequency image values" (FLAnt);
- calculating the histogram parameters of "scatter" (SDev) and of "relative area proportion of the most frequent image values" (FLAnt) for all sub-images; and
- evaluating the calculated histogram parameters of "scatter" (SDev) and of "relative area proportion of the most frequent image values" (FLAnt) according to the classification pattern.

In an embodiment of the invention, the correction curve G=f(L) is calculated by an accumulation or summation of the histogram values (Hi) of the aggregate histogram according to the following equation:

$$G = f(L) = \sum_{i=LMin}^{L} H(i)$$

The accumulation is respectively implemented between the minimum value (Lmin) and the maximum value (Lmax) of the luminance scope of the image original.

In an embodiment of the invention, it has likewise proven advantageous to smooth the correction curve G=f(L) with a low-pass filtering technique.

This smoothing of the correction curve G=f(L) is expediently implemented according to the "sliding mean" method, in that the values of the smooth correction curve G=f(L) are calculated as the weighted sum of neighboring values of the unsmoothed correction curve.

In an embodiment of the invention, the degree of correction for achieving a variable contrast correction is selectable with a correction factor (k). For that purpose, it can be provided that:

- a histogram gradation (HG) that corresponds to a maximum degree of correction (100%) is calculated from the luminance histogram of the image original according to a histogram modification method;
- a linear gradation (LG) that corresponds to a minimum degree of correction (0%) is generated; and
- a correction gradation (KG) for the variable contrast correction is formed by addition with the correction factor (k) of selectable portions of the histogram gradation (HG) and of the linear gradation (LG).

The formation of the correction gradation (KG) preferably occurs according to the following equation:

$$KG = k*HG + (1-k)*LG$$

The correction factor (k) is respectively selected dependent on the properties of the image original.

In an embodiment of the invention, an advantageous development arises wherein the correction factor (k) is selected depending on the degree of correction of a calculated contrast correction and/or depending on the path of the luminance distribution in the image original.

In an embodiment of the invention, an RMS actual value ($RMS_{grd}$) describing the maximum degree of correction is preferably calculated from the correction curve G=f(L) as a mean quadratic deviation of the histogram gradation (HG) from the linear gradation (LG), this being calculated according to the following equation:

$$RMS_{grd} = \sqrt{\left(\sum_{i=1}^{N} \delta_i^2\right)/N}$$

with:

$\delta_i$=deviation of a corrected image value (histogram gradation HG) from an uncorrected image value i (linear gradation (LG);

N=plurality of deviations ($\delta_i$).

In an embodiment of the invention, an RMS rated value (Rmsi) is calculated as a prescribed value for the contrast correction according to a classification pattern by comparing statistical histogram parameters of "skewness" (Skew) and "Kurtosis" (Kurt) calculated from the aggregate histogram of the image-critical sub-images to prescribable thresholds (SSw, KSw).

The correction factor (k) can then be formed as quotient from the RMS rated value (Rmsi) and the RMS actual value ($RMS_{grd}$).

In an embodiment of the invention, the analysis of the image gradation of an image original takes place on the basis of image values that are acquired by scanning the image original with a resolution (coarse scan) coarser than a resolution required for the reproduction of the image original (fine scan).

In an embodiment of the invention, a preferred development in the analysis of color originals arises wherein:

- the image values (R, G, B) of a first color space allocated to the input device are transformed into the functionally corresponding image values (L*, a*, b*) of a second color space (reference color space; communication color space) that is independent of the first color space (14); and
- the analysis of the image gradation for calculating setting values for the image processing is implemented on the basis of the transformed image values (L*, a*, b*).

In an embodiment of the invention, there is provided an apparatus for the analysis and correction of the image gradation of a color original by evaluating color values acquired by point-by-point and line-by-line, trichromatic scanning with an input device in apparatus and systems for color image processing, comprising:

- a color converter connected to input devices for conversion of the image values (R, G, B) of a first color space allocated to the input devices into functionally corresponding image values (L*, a*, b*) of a second color space that is independent of the first color space;
- an image processing unit for processing the transformed image values (L*, a*, b*) having an operating terminal and a communication unit for the intermediate storage of the processed image values (L*, a*, b*); and
- a master analysis unit connected to the image processing unit and to the operating terminal with which the analysis of the image gradation of an image original for the calculation of setting values for the image processing is implemented on the basis of the transformed image values (L*, a*, b*) of the second color space.

These and other features of the invention will become clearer below in the following detailed description of the presently preferred embodiments and accompanying drawings.

DETAILED DESCRIPTION OF THE PRESENTLY PREFERRED EMBODIMENTS

Figure 1:
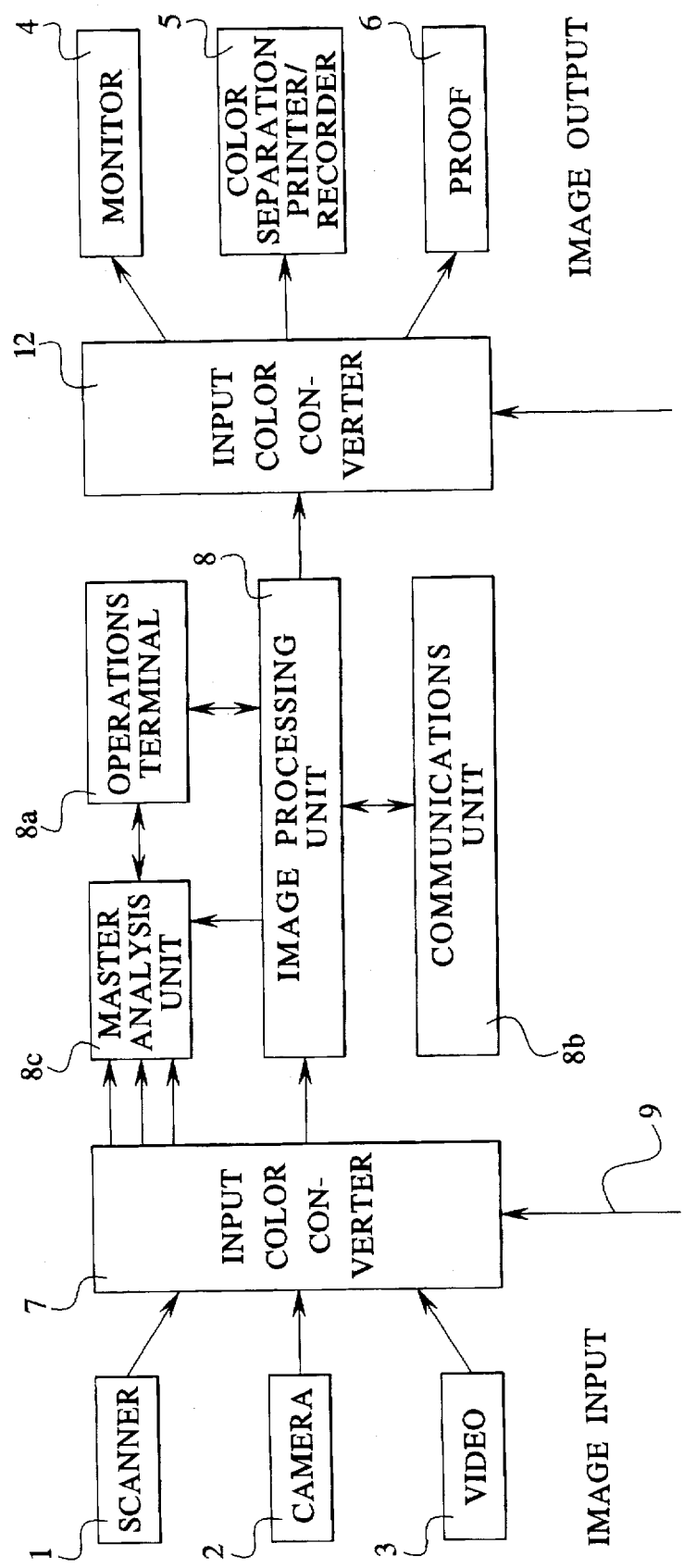
FIG. 1 illustrates a schematic diagram of a color image processing system.

FIG. 1 illustrates a schematic diagram of a structure of a color image processing system. Input devices that scan point-by-point and line-by-line are represented by the scanner 1; devices that scan planarly are represented by a camera 2; and devices for producing chromatic graphic data such as, for example, graphic design stations are represented by a video input 3. Various output devices are represented by a monitor 4, a color separation recorder 5 or by a proof recorder 6.

The color values R, G, and B of the respective device-dependent color spaces generated in the input devices 1, 2 and 3 are converted in an input color converter 7 into color values of a device-independent communication color space and are supplied to an image processing unit 8. The color conversion of the device-dependent color space into the communication color space occurs via a reference color system.

The input color converter 7, for example, is constructed as a memory table LUT wherein the output color values are addressably stored to be addressable by the corresponding input color values. The table values are input into the input color converter 7 via an input 9. In addition, an input calibration of the color values is implemented in the color conversion. The input color converter 7, as shown in FIG. 1, can be a separate unit or can be a component part of an input device 1, 2 or 3 or of the image processing unit 8.

In the image processing unit 8, the color corrections and geometrical processings desired by the operator are implemented on the basis of the transformed color values of the respectively employed communication color space. For that purpose, the image processing unit 8 is connected to an operating terminal 8a for the operator. The image processing unit 8 is also in communication with a communication unit 8b in which the color values to be processed can be intermediately stored.

Further, a master analysis unit 8c is provided that is connected to the image processing unit 8 and to the operating terminal 8a. A preselection as to whether the master analysis is to occur with respect to the image gradation or, on the other hand, is also to occur with respect to color cast and/or color scope can be made at programming inputs of the master analysis unit 8c.

Before the image gradation analysis, the color original to be analyzed is scanned point-by-point and line-by-line in the scanner 1 with a resolution (coarse scan) coarser than the resolution required for the actual reproduction (fine scan). The color values R, G, and B thereby acquired are digitized, are potentially pre-distorted according to a given function (Munsell), are converted in the color converter 7 into the color values of the selected communication color space 15, for example into the color values L*, a* and b*, and, finally, are stored in the communication unit 8b.

After this, the color values L*, a* and b* of the course scan are loaded from the communication unit 8b into the master analysis unit 8c and are investigated therein with respect to the image gradation according to mathematical and statistical methods.

Image-dependent pre-setting values that are forwarded to the operating terminal 8a result from the analysis. The operator can directly transfer the resulting pre-setting values into the image processing unit 8 for image setting or, on the other hand, can modify or, respectively, correct them in order to achieve an optimum setting.

After the image processing, the processed color values are read out from the image processing unit 8 and are converted into process color values in an output color converter 12 on the basis of an output color transformation, these process color values being supplied to the corresponding output devices 4, 5 and 6. A corresponding output calibration thereby occurs.

Figure 2:
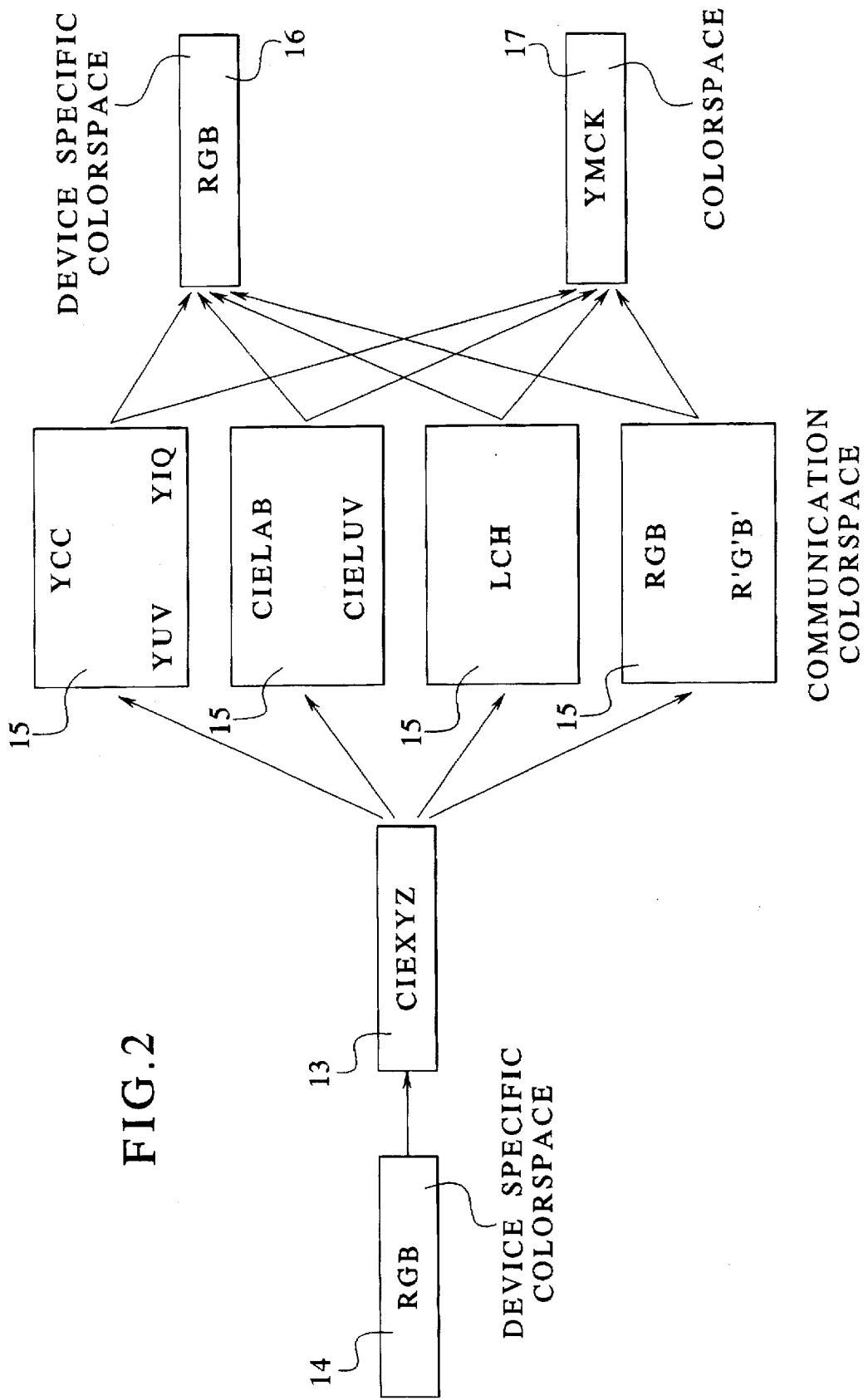
FIG. 2 illustrates a block diagram of a communication model for a color image processing system.

FIG. 2 illustrates a block diagram of a communication model for a color image processing system. The XYZ color value system (CIEXYZ) standardized by the Commission Internationale de l'Eclairge (CIE) [International Commission on Illumination] and that is based on the visual properties of the human eye can serve as the reference color system 13. The color values R, G, B of the device-specific RGB color space 14 of the input devices 1, 2, 3 are transformed by an input calibration into the reference color system 13. The color values X, Y, Z of the reference color system 13 are transformed by mathematically defined transformations into color values of a selectable, device-independent communication color space 15 with which the image gradation analysis and the image processing occur. Advantageously, communication color spaces 15 that conform with sensation, preferably the CIELAB color space are employed for the image gradation analysis. After the image processing, the transformation of the processed color values of the corresponding communication color space 15 into the process color values of the device-specific RGB color space 16 or, respectively, CMYK color space 17 of the output devices 4, 5 and 6 occurs.

Figure 3:
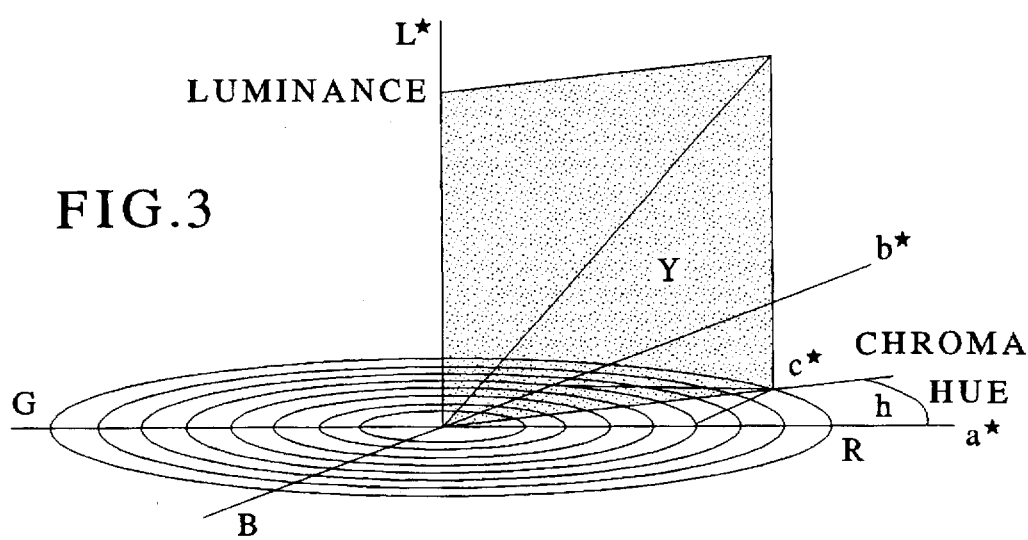
FIG. 3 illustrates a CIELAB color space.

FIG. 3 illustrates the CIE 1976 L*a*b* color space—referred to in short as CIELAB color space—that is equidistantly constructed approximately in conformity with sensation. The Cartesian coordinates of the CIELAB color space are allocated to the sensation-conforming quantities luminance L*, red-green chrominance a* (R-G) and yellow-blue chrominance b* (Y-B). The value range of the luminance L* extends from 100 for reference white through 0 for the absolute black. The value range of the chrominances a* and b* for colors emanating from an illuminated subject (non-self-luminesce perceived colors) extends from approximately −80 through approximately +120. The reference white and the absolute black have a chrominance of 0. The derived quantities of overall chrominance c* (chroma) and hue angle h can be calculated from the a*b* chrominances. The value range of the chrominance c* lies between 0 (neutral or gray) and approximately +120. The hue angle h lies between 0 and 360 degrees with reference to the positive a* axis.

The method of the invention for analysis and correction of image gradation in image originals is based on the following considerations.

A satisfactory reproduction quality of an image original can usually already be achieved on the basis of the proper balancing of light image and dark image, on the basis of a color cast correction and by prescribing a standard image gradation.

Further measures are required for a good or better reproduction quality. In this regard, details critical to the image must be selectively emphasized by an intensification in the corresponding tint value ranges, i.e., a contrast correction. This, however, can only occur at the expense of a reduction in contrast of tint value ranges that are unimportant to the image, for instance in the image foreground or image background.

These contrast corrections, i.e. the luminance corrections of the image values, are undertaken based on the correction of the image gradation characteristic with a correction curve a path of which is respectively matched to the image content of the image original, whereby a corrected, steeper image gradation characteristic effects an intensification of contrast, and a corrected, flatter image gradation characteristic effects a reduction in contrast.

What is important for a good contrast correction is a correct demarcation of the regions of the image original critical to the image from the regions of the original that are not critical for the image and to the corresponding definition of the path of the correction curve for a contrast correction.

An analysis of the image gradation evaluates the luminance distribution of an image original in view of low-contrast regions that, however, are critical to the image, demarcates the position of the tint value ranges of these low-contrast image details and derives the contrast-enhancing, corrected image gradation characteristic adapted to the image original therefrom.

The individual method steps [A] through [E] of the method for the analysis and correction of the image gradation in image originals (black-and-white originals and color originals) is set forth in greater detail below.

Method Step [A]

For identifying the frequency distribution of the luminance values from the image-critical regions of the original, the image original to be analyzed is geometrically divided into sub-images in a first method step [A], for example into a sub-image matrix of 16×16 sub-images.

Method Step [B]

In a second method step [B], a frequency distribution sub-image histogram of the image values of a black-and-white original or, respectively, the frequency distribution of the luminance component L* of the color values L*, a*, b* of a color original is calculated for every sub-image.

Method Step [C]

In a third method step [C], the sub-image histograms of the individual sub-images are statistically evaluated and the sub-images that are image-critical for the image gradation of the image original are then classified on the basis of the respective results of the evaluation.

Evaluation of the Sub-Image Histograms Step [C1]

The identification of the sub-images critical to the image and not critical to the image takes place, for example, with the assistance of the statistical histogram parameter SDev "scatter" or, respectively, "standard deviation" and of the histogram parameter FIAnt "relative area proportion of the most frequent image values", referred to in short as histogram parameter FIAnt "rel.area proportion". However, other histogram parameters can also be utilized.

The histogram parameter SDev "scatter" is a measure for the average mean deviation of the image values from the mean of the histogram distribution. Sub-images having a low scatter or standard deviation probably contain less structure and thus are not critical to the image. Sub-images having a high value of scatter or standard deviation probably contain a great deal of structure and thus are critical to the image.

A later classification into image-critical and image-noncritical regions ensues via a definable thresholding of the histogram parameter SDev "scatter" with a threshold value SwSDev. When the value of the histogram parameter SDev "scatter" of a sub-image is lower than the prescribed threshold SwSDev, then the sub-image is classified as being low in structure.

A conclusion regarding a great deal of structure in the sub-image cannot be unambiguously derived from a high value of the histogram parameter SDev "scatter". This is true, for example given images with large-area image regions of different luminance that are low in structure (for example, bimodal histogram distributions). The histogram parameter FIAnt "rel.area proportion" then is utilized for recognizing initialization in this type of image.

The histogram parameter FLAnt "rel.area proportion" serves as a measure of the "planarity" of the image original, i.e. for the proportion of low-structure image regions in the sub-image. The histogram parameter FLAnt "rel.area proportion" indicates the relative proportion of the most frequent image values with reference to the total number of image values in a sub-image. Sub-images having a high value of the histogram parameter FLAnt "rel.area proportion" probably contain little structure and thus are not considered critical to the image. Sub-images having a low value of the histogram parameter FLAnt "rel.area proportion" probably contain a great deal of structure and thus are critical to the image.

The later classification into image-critical and image-noncritical regions with the assistance of the histogram parameter FLAnt "rel.area proportion" likewise ensues via a definable thresholding step utilizing a threshold value SwFLAnt. When the histogram parameter FLAnt "rel.area proportion" of a sub-image is higher than the prescribed threshold SwFLAnt, then the sub-image is classified as low-structure.

For the later sub-image classification, the threshold SwSDev of the histogram parameter SDev "scatter" and the threshold SwFLAnt of the histogram parameter FLAnt "rel.area proportion" are first defined. The thresholds determine the division into the two parameter classes. Given image originals having much structure, i.e. when a great number of sub-images contains structure, a higher threshold can be selected higher. Given image originals having less structure, i.e. when a small number of sub-images contains structure, a lower threshold can be selected.

For evaluating the sub-image histograms, the histogram parameter SDev "scatter" and the histogram parameter FLAnt "rel.area proportion" are calculated for every sub-image according to calculating methods for statistical evaluation of histograms.

The histogram parameter SDev "scatter" is calculated in the following way:

A sub-image composed of a sequence of image values $x_1$, ... $x_N$. N references the total plurality of image values in the value range of the image values $x_i$: 1, ... M. H(i) is the plurality of image values having the value i in a sub-image.

The plurality of image values N is first calculated:

$$N = \sum_{i=1}^{M} H(i)$$

For the calculation of the histogram parameter SDev "scatter", the mean value of the frequency distribution is then first calculated, whereby the mean value of a frequency distribution is that image value around which the other image values of the distribution group. The mean value is generated by the following:

$$\text{Mean} = \frac{1}{N-1} \sum_{i=1}^{M} i * H(i)$$

Subsequently, the variance Var is defined:

$$Var = \frac{1}{N-1} \sum_{i=1}^{M} (i - \text{Mean})^2 * H(i)$$

The histogram parameter SDev "scatter" derives therefrom as:

$$SDev = \sqrt{Var}$$

The standard deviation or, respectively, variance is a measure for the average or mean deviation of the image values from the mean of the distribution. When the standard deviation is low, then the image values lie close to the mean on average (narrow frequency distribution). When the standard deviation is high, then greater deviations of the image values from the mean will be more frequent (broad frequency distribution).

The histogram parameter FLAnt "rel.area proportion" is calculated in the following way:

For calculating the histogram parameter FLAnt "rel.area proportion", the histogram values H(i) are first sorted in the descending sequence of the frequency→$H_s(i)$. By prescribing the plurality n of histogram values $H_s(i)$ to be accumulated, the histogram parameter FLAnt is calculated as:

$$FlAnt(S) = \sum_{i=1}^{n} H_s(i)/N$$

The histogram parameter FLAnt indicates the relative proportion S of the most frequent image values with reference to the total number of image values and is a measure for the "planarity" or "flatness" of the original, i.e. for the proportion of low-structure image regions in the original.

After the calculation of the histogram parameter SDev "scatter" and FLAnt "rel.area proportion", the thresholds SwSDev and SwFLAnt are defined, as set forth below.

It has proven advantageous to define the threshold SwSDev and/or the threshold SwFLAnt depending on the original in order to obtain an adequate plurality of image-critical sub-images for calculating the luminance histograms.

The following process can be implemented for defining the threshold SwSDev for the histogram parameter SDev "scatter".

For image-dependent definition of the threshold SWSDev, the frequency distribution of the values of the histogram parameter SDev "scatter" of the individual sub-images is utilized.

Figure 4A:
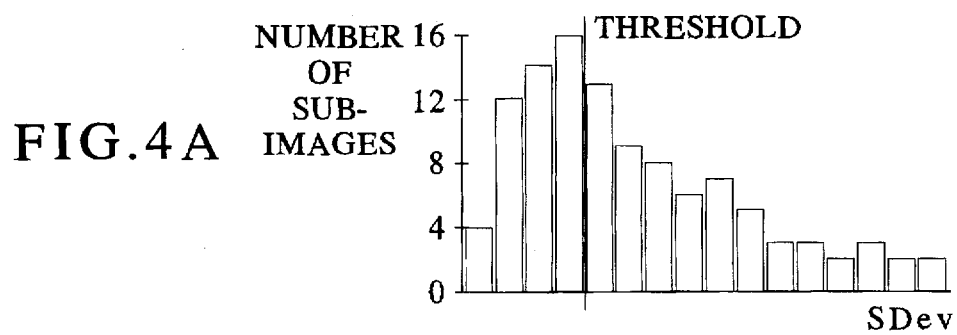
FIGS. 4A and 4B illustrate a frequency distribution of the histogram parameter of "scatter" (standard deviation) for image originals having different structures.
Figure 4B:
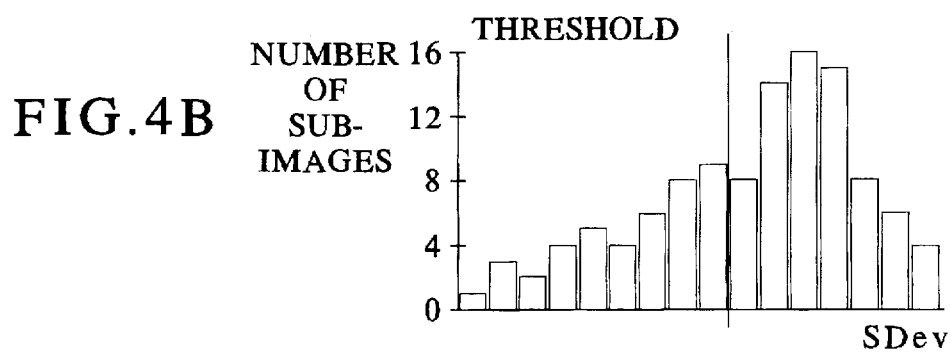

For that purpose FIGS. 4A and 4B illustrate a frequency distribution of the histogram parameter SDev "scatter" for image originals having little structure (upper. FIG. 4A) and for image originals having much structure (lower. FIG. 4B). Differently defined thresholds S respectively separate the frequency distributions into two parts that can be interpreted as being separate frequency distributions.

The "informational content" (entropy) is respectively calculated for separate frequency distributions, whereby the threshold S is shifted across the possible value range. The entropy function Φ (S) is defined as the sum of the entropies of the two individual, separate frequency distributions dependent on the threshold S shifted over the possible value range.

Figure 5:
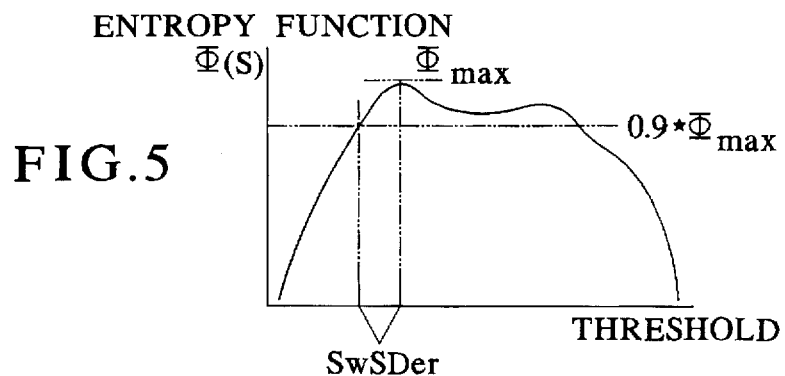
FIG. 5 illustrates a typical curve of an entropy function.

For that purpose, FIG. 5 illustrates a typical course of an entropy function b (S). For example, that value S at which the entropy function Φ (S) has a maximum value or at which the entropy function Φ (S) achieves a percentage of the maximum value of, for example, 90% is then selected as the threshold SwSDev for the histogram parameter SDev "scatter".

The following may be said regarding the definition of the threshold SwFLAnt for the histogram parameter FLAnt "rel.area proportion":

For example, a fixed value can be prescribed for the threshold SwFLAnt of the histogram parameter FLAnt "rel.area proportion". However, the plurality of the most frequent image values to be accumulated is identified depending on the image scope (minimum/maximum value of luminance) in the calculation of the histogram parameter FLAnt.

After the calculation of the histogram parameter SDev and FLAnt for all sub-areas, the histogram parameters SDev and FLAnt are recalled in and compared to the corresponding thresholds SwSDev and SwFLAnt for the classification of image-critical (structure-rich) and image-uncritical (structure-poor) sub-images.

Sub-Image Classification Step [C2]

The classification of the sub-images can proceed according to the following classification pattern:

| Parameter | Parameter "Scatter" | |
|---|---|---|
| "Rel. area proportion" | SDev < SwSDev | SDev > SwsDev |
| FLAnt > SwFLAnt | Sub-image Without Structure | Sub-image Without Structure |
| FLAnt < SwFLAant | Sub-image Without Structure | Sub-image With Structure |

Denoted in this classification pattern are:
SDev=histogram parameter "scatter"
FLAnt=histogram parameter "rel.area proportion"
SwSDev=threshold for histogram parameter "scatter"
SwFLAnt=threshold for histogram parameter "rel.area proportion".

A sub-image that only contains structure is thus classified as image-critical when the value of the histogram parameter SDev "scatter" is higher than the prescribed threshold SwSDev and the value of the histogram parameter FLAnt is lower than the prescribed threshold SwFLAnt.

The sub-image histograms of those sub-images that were classified as structure-rich according to the above classification pattern are utilized for the calculation of the aggregate histogram according to Method Step [D], and this is set forth below.

Method Step [D]

In a fourth method step [D], an aggregate histogram that corresponds to the frequency distribution of the image values or, respectively, of the luminance component in the image-critical sub-images is calculated from the sub-image histograms of the subimages classified as image-critical. For that purpose, the functionally corresponding frequency values for every luminance stage L* are added together in the individual sub-image histograms of the image-relevant sub-images and the summed-up frequency values are defined a as new frequency distribution over the corresponding luminance values L* as aggregate histogram.

Figure 6B:
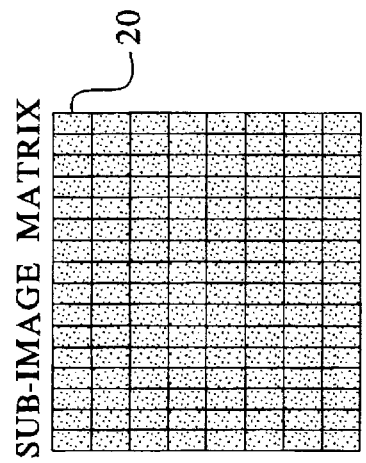
FIG. 6A illustrates a prior art curve of a luminance histogram without classification of image-critical sub-images and FIG. 6B shows the corresponding prior art sub-image matrix corresponding thereto.
Figure 6D:
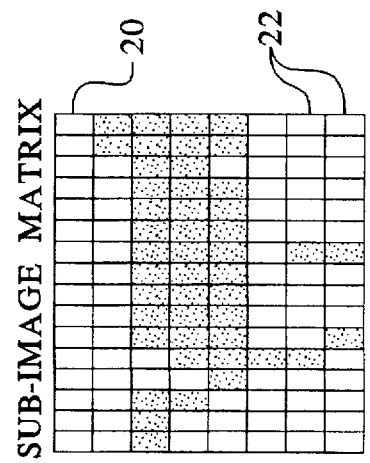
FIG. 6D shows a corresponding sub-image matrix corresponding thereto.
Figure 6A:
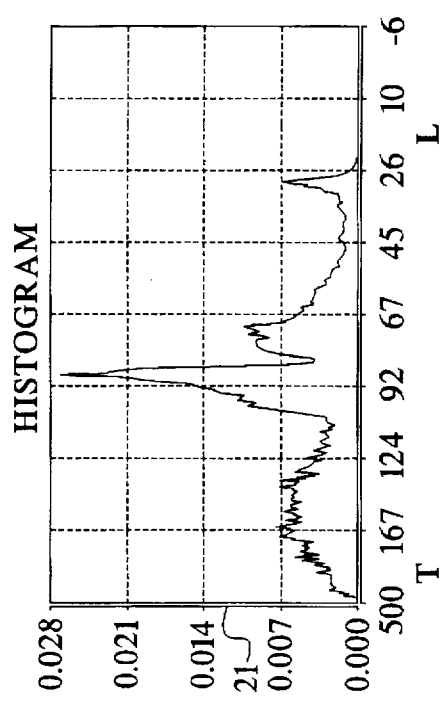

FIG. 6A illustrates the trend of a prior art luminance histogram without classification of image-critical sub-images. FIG. 6B juxtaposes an image original 20. According to the prior art, the entire image original is utilized for the formation of the resulting luminance histogram 21, this being shown in FIG. 6A.

Figure 6C:
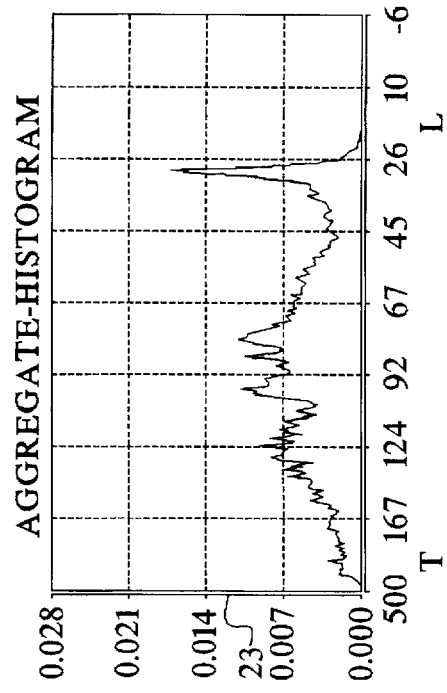
FIG. 6C illustrates a curve of a luminance histogram with classification of image-critical sub-images.

FIG. 6C shows an example of a classification of image-critical sub-images and the trend of an aggregate histogram that results from the sub-image histograms of the image-critical sub-images.

FIG. 6D again shows an image original 20 that was subdivided into sub-images 22 according to method step [A]. According to method steps [B] and [C], sub-image histograms produced for the sub-images 22 and image-critical sub-images are identified by evaluating the sub-image histograms. Image-critical subimages are marked in black by way of example in FIG. 6D.

The aggregate histogram 23 formed according to method step [D] is shown in the FIG. 6C. This aggregate histogram reproduces the frequency distribution of the luminance values L* from the image-critical regions of the original.

The aggregate histogram is employed for the calculation of a correction curve G=f(L) [in] method step [E] for the correction of the image gradation characteristic for the purpose of contrast correction.

Method Step [E]

In a fifth method step [E], a correction curve G=f(L) for a contrast correction is calculated from the aggregate histogram according to the histogram modification method.

The histogram modification method is set forth below in greater detail.

Histogram Modification Method

Methods of histogram modification are fundamentally well-suited for the automatic calculation of a correction curve for contrast correction, since a characteristic curve for contrast correction matched to a specific image original can be independently calculated on the basis of a statistical image analysis and contrast sensation models or concepts.

In the histogram modification methods, the contrast changes are implemented based on the frequency distribution of the image values (histogram). The image values of an original image are resorted via a transformation such that the histogram of the processed image assumes a specific course.

A histogram modification method is set forth, for example, with reference to the example of a histogram equalization, this being implemented in the following steps:

In a first step, the frequency distribution of the image values is identified.

In a second step, a transformation characteristic that corresponds to the aggregate frequency of the frequency distribution is calculated by summing the histogram values.

In a third step, the image values are transformed via the transformation characteristic.

After the transformation of the image values with the gradation transformation characteristic, the histogram of the processed image exhibits a modified course or trend.

In the ideal case of extremely small graduation (quantization) of the image values (continuous image values), the histogram is exactly equally distributed. Given a courser quantization of the image values (discrete image values), an equal distribution of the image values can no longer be achieved by the redistribution of the image value steps but the frequency peaks are broadened and highly flattened.

Figure 7A:
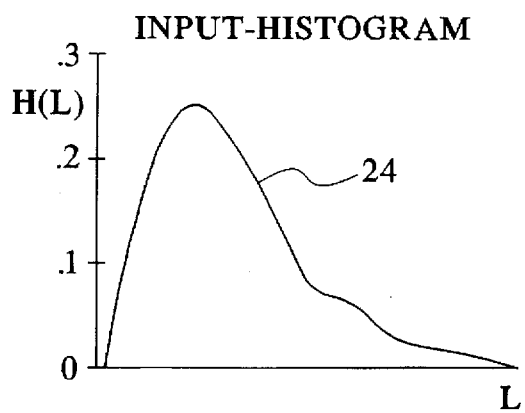
FIGS. 7A and 7B respectively illustrate the principle of "histogram equalization" with continuous and discrete image values.
Figure 7B:
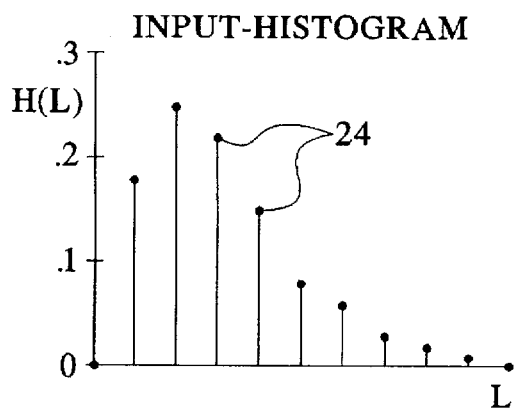
Figure 7C:
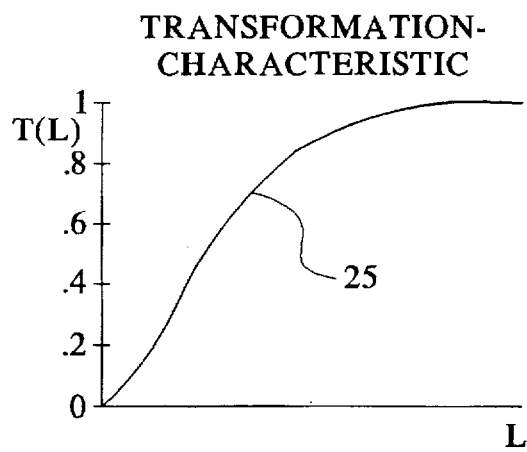
Figure 7D:
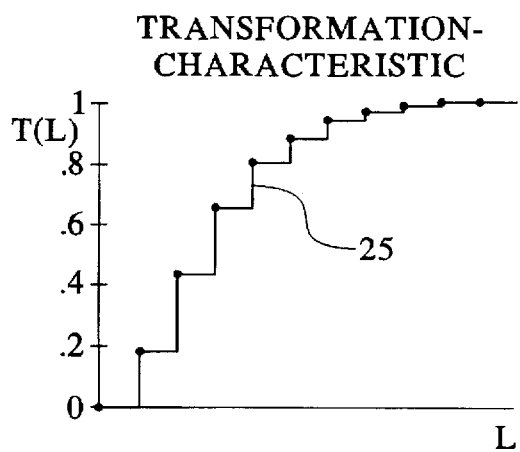
Figure 7E:
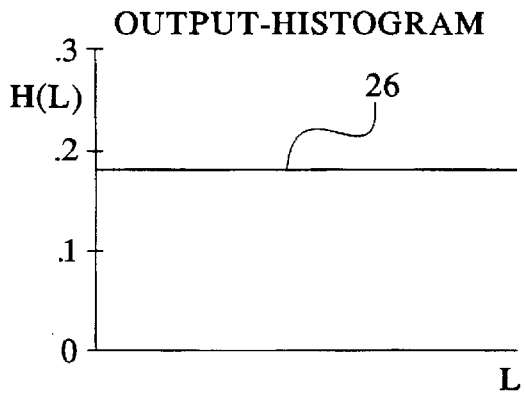
Figure 7F:
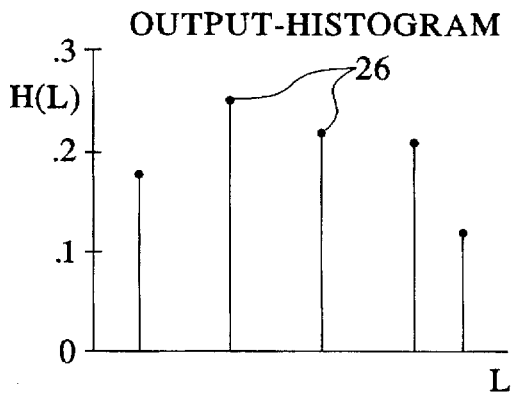

FIGS. 7A–7F illustrates the principle of the method of histogram equalization with continuous image values (FIGS. 7A, 7C and 7E) and with discrete image values FIGS. 7B, 7D, and 7F). An input histogram 24, a transformation characteristic 25 and an output histogram 26 are respectively illustrated, the latter corresponding to the input histogram 24 modified according to the transformation characteristic.

The correction curve G=f(L) calculated according to the method of histogram equalization effects an intensification of contrast by spreading image value steps in the tonal value ranges of the frequent image values (steep characteristic curve) and effects a reduction in contrast by combining image value steps in the tonal value ranges of the less frequent image values (flat characteristic curve).

Following this explanation of the method of a histogram modification or, respectively, histogram equalization, reference is now made again to method step [E]. The determination of the correction curve G=f(L) according to method step [E] for correcting the image gradation characteristic occurs according to the above-described method of histogram modification by accumulation of the histogram values H(i) of the aggregate histogram in the range LMin through LMax according to the equation:

$$G(L) = \sum_{i=LMin}^{L} H(i)$$

The accumulation of the histogram values H(i) is thereby implemented only between the analyzed, minimum and maximum values of the luminance scope of the original (light image and dark image values).

Figure 8A:
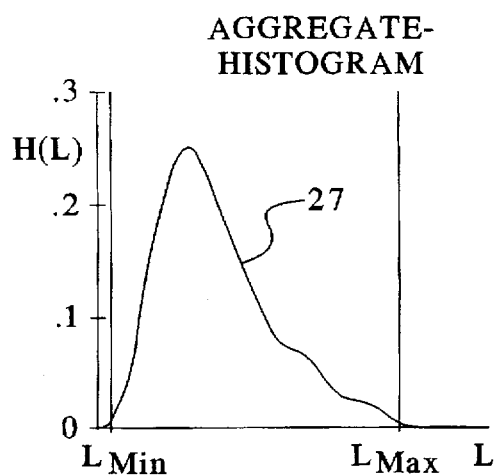
FIG. 8A is an aggregate-histogram and FIG. 8B is a correction curve showing the calculation of a correction curve from the aggregate histogram.
Figure 8B:
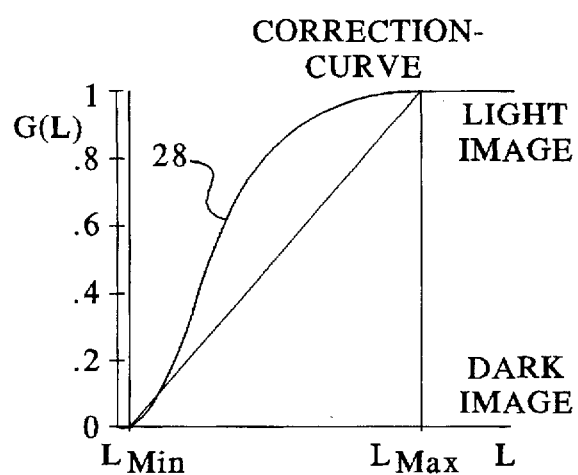

FIGS. 8A and 8B illustrate a graphic illustration of the determination of the correction curve G=f(L) 28 between dark image and light image from the aggregate histogram 27.

The smoothing of the correction curve G=f(L) ensues on the basis of a low-pass filtering according, for example, to the "sliding mean" method. According to this method, the values of the smoothed characteristic are calculated as the weighted sum of neighboring values of the unsmoothed characteristic. Due to the specific selection of the weighting factors, an optimum smoothing by a polynomial of the third order with minimum deviation in the quadratic mean is achieved in the averaging interval of, for example, 5 values. The weighting factors can be formed in the following way:

| –3/35 | 12/35 | 17/35 | 12/35 | –3/35 |
|---|---|---|---|---|

The course of the correction curve G=f(L) for the contrast correction is reproduced by a limited plurality of supporting values (for example, 16 supporting values). The selection of the supporting values from the values of the smoothed characteristics ensues optimally equidistantly in visual terms. The contrast correction determined from the luminance histogram is calculated into the color image values as, for example, a pure luminance correction via a change of the neutral gradation. Supporting values between the light image values and dark image values are identified for the correction curve G=f(L).

The actual contrast correction occurs in the image scanning devices 1, 2, 3, in that the calculated correction curve G=f(L) is forwarded to the image scanner device and the image gradation characteristic deposited thereat, for example, in table memories LUT, is corrected according to the correction curve G=f(L). The image values acquired by a fine scan in the image scanner device are then utilized for the conversion according to the corrected image gradation characteristic.

The employment of the correction curve G=f(L) usually leads to great contrast corrections in practice, these being frequently not desired.

Variable Contrast Correction

An advantageous development of the method is therefore comprised therein that the contrast correction is made variable with the assistance of a selectable correction factor k so that the degree of correction can be set via the correction factor k from a minimum (0%) through a maximum (100%).

A variable contrast correction is set forth below with reference to FIGS. 9A and 9B. First, a histogram gradation HG (30) is defined from the luminance histogram H (29) according to the method of histogram modification. The application of the histogram gradation HG (30) corresponds to the 100% degree of correction. Simultaneously, a linear gradation LG (31) is produced that corresponds to a 0% degree of correction.

The variable contrast correction for an image original occurs via a correction gradation KG (32) that is formed by addition of gradation parts of the histogram gradation HG (30) selectable via the correction factor k and the linear gradation LG (31) according to the following equation:

$$KG = k \cdot HG + (1-k) \cdot LG$$

Figure 9A:
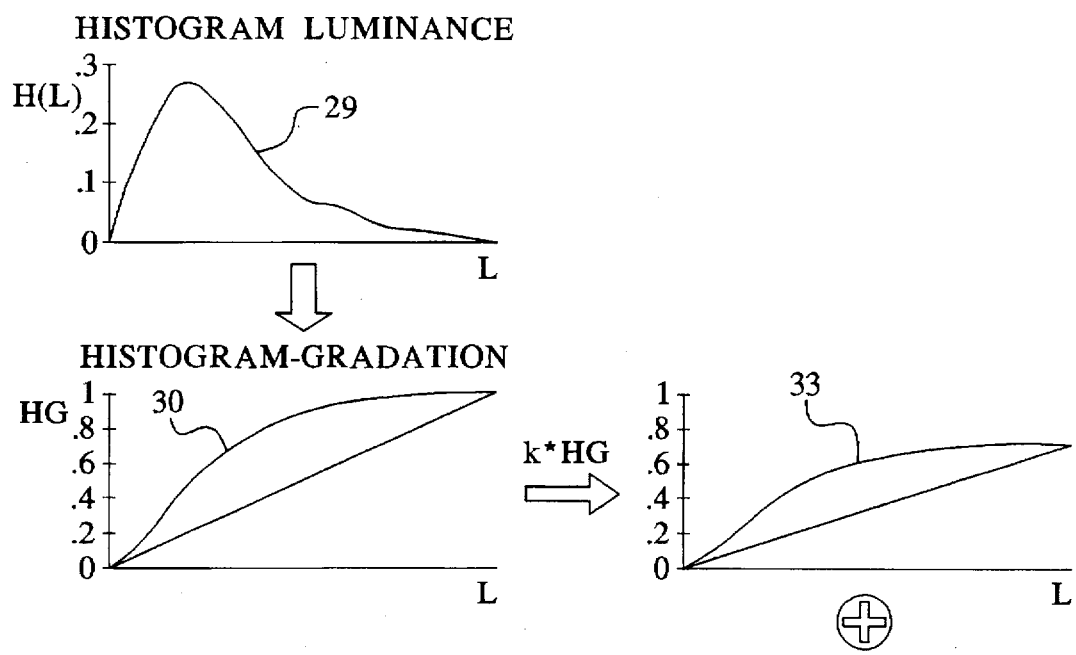
FIGS. 9A and 9B show a series of graphs explaining variable contrast correction.
Figure 9B:
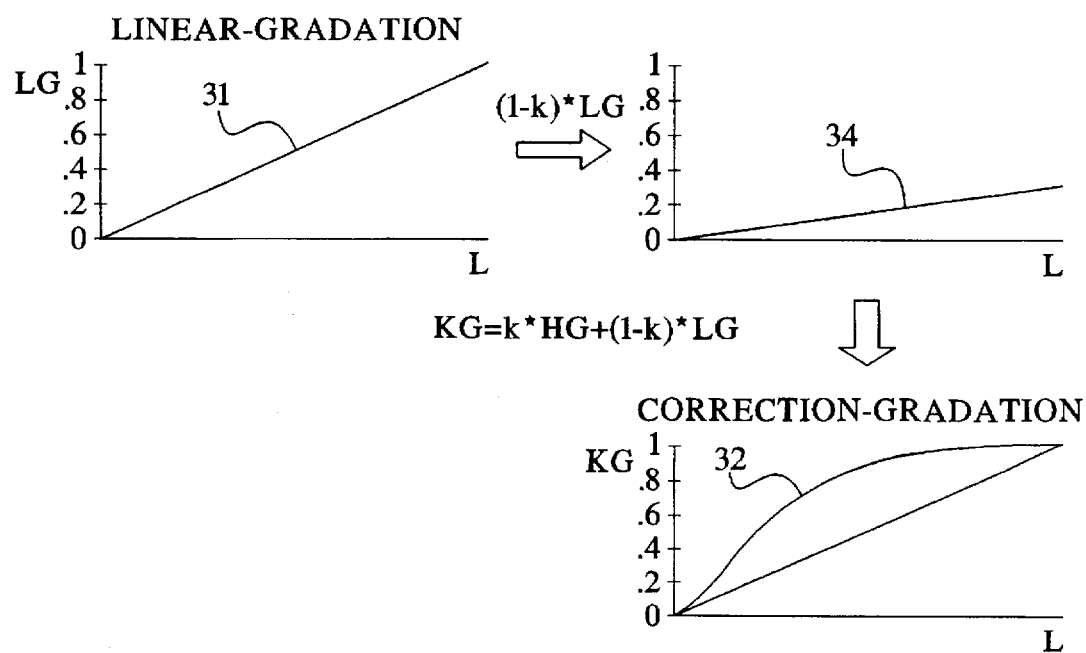

The selectable gradation parts k*HG (33) and (1−k)*LG (34) are likewise illustrated in FIGS. 9A and 9B.

The degree of correction is advantageously designed image-dependent, such that the correction factor k is respectively defined depending on the properties of the image original.

The determination of an image-dependent correction factor k is based on the following principle:

The mean quadratic deviation of the calculated course of the correction curve G=f(L) (maximum contrast correction) from the linear course of the correction curve G f(L) (minimum contrast correction) is a measure for the "visual" strength of the contrast correction. The mean quadratic deviation (root means square), referenced RMS value, is determined from the visually equidistant luminance image values L*. A high RMS value corresponds to a great contrast correction; a low RMS value corresponds to a lower contrast correction.

The RMS value of the calculated course of the correction curve G=f(L), however, does not generally correspond to the visually necessary correction. The required degree of the contrast correction is generally dependent on the course of the frequency distribution of the luminance values. Image originals having highly one-sided histogram curves (too light/dark) usually require a more pronounced correction. Image originals having more balanced histogram curves usually require less of a correction or no correction.

Whether a histogram distribution is more balanced or highly one-sided can be advantageously derived from the statistical histogram parameters "skewness" and "Kurtosis".

The parameter "skewness" (symmetry coefficient) describes the inequality of the spikes or peaks in a histogram distribution. The parameter "Kurtosis" is a measure for the course (flat/peaked) of a histogram distribution.

The calculation of the histogram parameters Skew "skewness" and Kurt "Kurtosis" occurs from the aggregate histogram of the classified, image-critical sub-images according to the following equations:

Histogram Parameter Skew "Skewness", $$Skew = \frac{1}{N} \sum_{i=1}^{M} ((i - Mean)/SDev)^3 \cdot H(i)$$

Histogram Parameter Kurt "Kurtosis", $$Kurt = \frac{1}{N} \sum_{i=1}^{M} ((i - Mean)/SDEV)^4 \cdot H(i) - 3$$

The histogram parameter Skew "skewness" (symmetry coefficient) describes the inequality of the spurs of a distribution, i.e. the differences of the positive and negative deviation of the image values from the mean. The symmetry coefficient is positive when the frequency distribution has long spurs toward high values. By contrast, the symmetry coefficient is negative when the frequency distribution has long spurs toward low values. For symmetrical frequency distributions, the symmetry coefficient is approximately zero.

The histogram parameter Kurt "Kurtosis" is a measure for the course (flat/peaked) of a frequency distribution relative to the normal distribution. When the histogram parameter Kurt "Kurtosis" is small or, respectively, negative, then the frequency distribution exhibits a flat course (broad frequency distribution); when, by contrast, it is high, then the frequency distribution exhibits a peaked course (narrow frequency distribution).

Figure 10A:
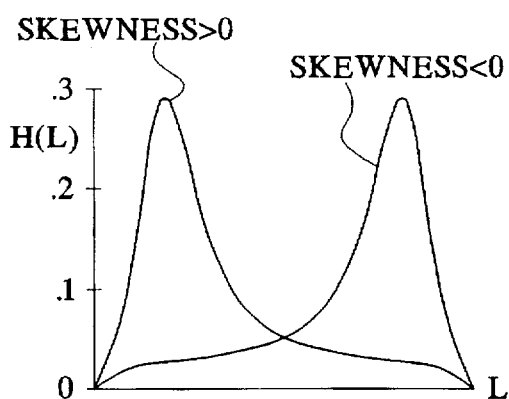
FIGS. 10A and 10B respectively illustrate histogram distributions and values of the histogram parameters "skewness" and "Kurtosis"
Figure 10B:
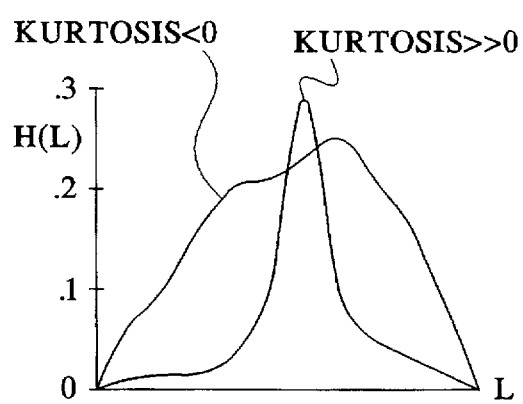

FIGS. 10A and 10B show various histogram distributions and values of the histogram parameters Skew "skewness" and Kurt "Kurtosis".

The determination of the correction factor k is advantageously undertaken dependent on the strength of the calculated contrast correction (RMS value) and/or dependent on the course of the luminance distribution of the histogram parameters Skew "skewness" and Kurt "Kurtosis" according to the following steps.

In a first step, the RMS actual value of the correction curve G=f(L) (histogram gradation) is calculated. The RMS actual value corresponds to a maximum degree of correction.

Figure 11:
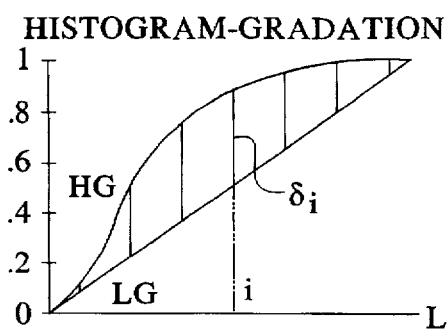
FIG. 11 illustrates a graph of RMS values of a histogram gradation.

The RMS actual value of the calculated correction curve G=f(L) (histogram gradation) is defined as root mean square of the histogram gradation (HG) from a linear gradation (LG). For this purpose, FIG. 11 shows the RMS value of a histogram gradation (HG).

The calculation of the RMS actual value ($RMS_{grd}$) of the histogram gradation (HG) ensues according to the following equation:

$$RMS_{grd} = \sqrt{\left( \sum_{i=1}^{N} \delta_i^2 \right) / N}$$

wherein:

$\delta_i$ = deviation of the corrected image value (histogram gradation HG) from an uncorrected image value i (linear gradation LG);

n = plurality of deviations $\delta_i$.

In a second step, the RMS rated value is identified as RMS prescribed value for the contrast correction with reference to a classification pattern.

The classification into three regions "balanced", "one-sided" and "highly one-sided" ensues by comparing the statistical histogram parameters Skew "skewness" and Kurt "Kurtosis" to defined thresholds SSW1, SSw2 or, respectively, KSw1, KSw2 as follows:

Classification Pattern:

|  | Kurtosis | | | |
|---|---|---|---|---|
| <KSws1 | >KSw1 | >KSw2 | Absolute Value | skewness |
| Rms 1 | Rms 2 | Rms 3 | <SSw1 | |
| Rms 2 | Rms 3 | Rms 4 | >SSw1 | |
| Rms 3 | Rms 4 | Rms 5 | >SSw2 | |

The RMS prescribed values Rmsi therein denote the following for the contrast correction:

Rms1=weak contrast correction
Rms2=weak contrast correction
Rms3=moderate contrast correction
Rms4=moderate contrast correction
Rms5=great contrast correction, wherein:

SSw1, SSw2=thresholds of the histogram parameter "skewness"

KSw1, KSw2=thresholds of the histogram parameter "Kurtosis".

An RMS prescribed value $Rms_i$ for the necessary contrast correction derived from the image gradation analysis derives as result of the classification.

In a third step, the required value of the correction factor k is then calculated from the RMS prescribed value Rmsi (RMS rated value) and from the RMS actual value $RMS_{grd}$:

$$k = \frac{R_{msi}}{RMS_{grd}}$$

The value of the correction factor k generally lies between 0.0 (minimal correction) and 1.0 (maximum correction). When the calculation of the correction factor yields values greater than 1.0, then the value is limited to 1.0.

Although modifications and changes may be suggested by those skilled in the art, it is the intention of the inventors to embody within the patent warranted hereon all changes and modifications as reasonably and properly come within the scope of their contribution to the art.

I claim:

1. A method for analysis and correction of an image gradation characteristic of an image original, comprising the steps of:

generating image values relating to the image original by point-by-point and line-by-line, optoelectronic scanning with an image processing input device;

geometrically subdividing the image original into a plurality of sub-images, each sub-image having corresponding image values;

for each sub-image, separately identifying frequency distributions of the image values in the corresponding sub-images as a sub-image histogram for every sub-image;

evaluating the sub-image histograms of the individual sub-images and identifying sub-images critical for image gradation since they are identified as being high in structure wherein relatively large image value changes occur as compared to other of the sub-images which are lower, in structure wherein relatively smaller image value changes occur;

generating an aggregate histogram comprising a summation of frequency distributions of the image values in the critical sub-images from the sub-image histograms of the critical sub-images; and generating a correction curve function from the aggregate histogram for correction of the image gradation characteristic of the image original for contrast correction.

2. The method of claim 1 wherein the image values are color values each of which comprises a luminance component, and the frequency distributions are generated for the luminance component.

3. The method of claim 1, wherein the evaluation of the sub-image histograms for the identification of the critical sub-images occurs by use of statistical histogram parameters.

4. A method for analysis and correction of an image gradation characteristic of an image original, comprising the steps of:

generating image values relating to the image original by point-by-point and line-by-line, optoelectronic scanning with an image processing input device;

geometrically subdividing the image original into a plurality of sub-images, each sub-image having corresponding image values;

for each sub-image, separately identifying frequency distributions of the image values in the corresponding sub-images as a sub-image histogram for every sub-image;

evaluating the sub-image histograms of the individual sub-images by use of statistical histogram parameters and identifying critical sub-images for image gradation based on the evaluation;

for identifying the sub-images which are critical, calculating a histogram parameter "scatter" (SDev) and a histogram parameter "relative area proportion of the most frequent image values" (FLAnt) for each of the sub-image histograms and utilizing them for the evaluation of the sub-image histograms, the histogram parameter "scatter" (SDev) and the histogram parameter "relative area proportion of the most frequent image values" (FLAnt) being measures of an amount of details present in a given sub-image;

generating an aggregate histogram comprising a summation of frequency distributions of the image values in the critical sub-images from the sub-image histograms of the critical sub-images; and generating a correction curve function from the aggregate histogram for correction of the image gradation characteristic of the image original for contrast correction.

5. The method of claim 4, wherein the identification of the critical sub-images is undertaken by comparing the histogram parameters "scatter" (SDev) and "relative area proportion of the most frequent image values" (FLAnt) with respective thresholds (SwSDev) and (SWFLAnt) selected for the image original.

6. The method of claim 5, wherein a sub-image is classified as a critical sub-image when the value of its respective histogram parameter "scatter" (SDev) is higher than the threshold (SwSDev) and the value of the histogram parameter "relative area proportion of the most frequent image values" (FLAnt) of the sub-image is lower than the threshold (SwFLAnt).

7. The method of claim 4, wherein the threshold (SwSDev) for the histogram parameter "scatter" (SDev) is calculated from a frequency distribution of the values of the histogram parameter "scatter" (SDev) of all sub-images.

8. The method of claim 4, wherein the histogram parameter "scatter" (SDev) and the histogram parameter "relative area proportion of the most frequent image values" (FLAnt) of the sub-images are calculated by a statistical evaluation of the corresponding sub-image histograms.

9. The method of claim 4, wherein the histogram parameter "scatter" (SDev) for a sub-image is calculated by means of the following steps:

calculating a plurality (N) of image values for the sub-image from the sub-image histogram (Hi(i), according to the equation $$N = \sum_{i=1}^{N} H(i);$$

whereby (H(i)) corresponds to the number of picture elements having the image value (i) in the sub-image;

calculating a mean of the frequency distribution from the sub-image histogram (Hi(i), i=1 ... M) according to the equation:

$$\text{Mean} = \frac{1}{N-1} \sum_{i=1}^{N} i*H(i)$$

calculating a variance (Var) according to the equation $$Var = \frac{1}{N-1} \sum_{i=1}^{N} (i - \text{Mean})^2 * H(i)$$

and identifying the histogram parameter of "scatter" (SDev) according to the equation $$SDev = \sqrt{Var}.$$

10. The method of claim 4, wherein the histogram parameter "relative area proportion of the most frequent image values" (FLAnt) for a sub-image is calculated according to the following steps:

calculating a plurality N of image values for the sub-image from corresponding sub-image histogram values (Hi(i), i=1, ..., M) according to the equation $$N = \sum_{i=1}^{N} H(i)$$

whereby (H(i)) corresponds to the plurality of picture elements having the image value (i) in the sub-image;

resorting histogram values (Hs(i)) of the corresponding sub-image histogram (Hi) in descending sequence of the frequency to form a new frequency distribution of histogram values (Hs(i));

defining a plurality (n) of histogram values (Hs(i)) to be accumulated; and calculating the histogram parameter "relative area proportion of the most frequency image values" (FLAnt) according to the equation $$FLAnt(n) = \sum_{i=1}^{n} H_s(i)/N.$$

11. The method of claim 5, wherein a classification of said identified critical sub-images is undertaken by means of the following steps:

selecting the thresholds (SwSDev) and (SWFLAnt) for the histogram parameters of "scatter" (SDev) and of "relative area proportion of the most frequency image values" (FLAnt);

calculating the histogram parameters of "scatter" (SDev) and of "relative area proportion of the most frequent image values" (FLAnt) for all sub-images; and evaluating the calculated histogram parameters of "scatter" (SDev) and "relative area proportion of the most frequent image values" (FLAnt) according to a classification pattern.

12. The method of claim 1, wherein for each luminance value which is an image value of a black/white image or luminance component of a color image the functionally corresponding frequency distribution values in the individual sub-image histograms of the identified critical sub-images of the image original are added, the added frequency distribution values calculated for each luminance value defining a new histogram in the form of said aggregate histogram.

13. A method for analysis and correction of an image gradation characteristic of an image original, comprising the steps of:

generating image values relating to the image original by point-by-point and line-by-line, optoelectronic scanning with an image processing input device, the image values being color values each of which comprises a luminance component;

geometrically subdividing the image original into a plurality of sub-images, each sub-image having corresponding image values;

for each sub-image, separately identifying frequency distributions for the luminance component of the image values in the corresponding sub-images as a sub-image histogram for every sub-image;

evaluating the sub-image histograms of the individual sub-images and identifying sub-images critical for image gradation since they are identified as being high in structure wherein relatively large image value changes occur as compared to other of the sub-images which are lower in structure wherein relatively small image value changes occur;

generating an aggregate histogram comprising a summation of frequency distributions of the image values in the critical sub-images from the sub-image histograms of the critical sub-images, and wherein for each luminance value which is an image value of a black/white image or luminance component of a color image, functionally corresponding frequency distribution values and the individual sub-image histograms of the identified critical sub-images of the image original are added, the added frequency distribution values calculated for each luminance value defining a new histogram in the form of said aggregate histogram; and generating a correction curve function G=f(L) from the aggregate histogram for correction of the image gradation characteristic of the image original for contrast correction, the correction curve G=f(L) being calculated according to a histogram modification method by accumulating histogram values (H(i)) of the aggregate histogram of the image-critical sub-images according to the following equation:

$$G = f(L) = \sum_{i=LMin}^{L} H(i)$$

and wherein the accumulation is undertaken between a minimum value (LMin) and a value (L) of a luminance value range of the image original.

14. The method of claim 13, wherein the accumulation is undertaken between a minimum value (LMin) and a maximum value (Lmax) of the luminance of the image original.

15. The method of claim 13, wherein the correction curve G=f(L) is smoothed with a low-pass filtering.

16. The method of claim 15, wherein the smoothing of the correction curve G=f(L) is implemented according to a "sliding mean" method, such that each value of the smoothed correction curve G=f(L) is calculated as a weighted sum of neighboring values of the unsmoothed correction curve.

17. The method of claim 16, wherein a degree of correction of said image gradation characteristic is made selectable by means of a correction factor (k) in order to provide for variable contrast correction.

18. The method of claim 17, wherein:

a histogram gradation factor (HG) that corresponds to a maximum degree of correction (100%) is calculated from an image value histogram of the image original utilizing a histogram modification method;

a linear gradation factor (LG) that corresponds to a minimum degree of correction (0%) is generated; and a correction gradation factor (KG) for the variable contrast correction is formed by adding together portions of the histogram gradation factor (HG) and of the linear gradation factor (LG).

19. The method of claim 18, wherein the formation of the correction gradation factor (KG) occurs according to the following equation, whereby the correction factor (k) lies in the value range from 0.0 through 1.0:

$$KG = k*HG + (1-k)*LG.$$

20. The method of claim 17, wherein the correction factor (k) is dependent on properties of the image original.

21. The method of claim 18, wherein an RMS actual value ($RMS_{grd}$) describing a maximum degree of correction is calculated from the correction curve G=f(L) as the mean quadratic deviation of the histogram gradation (HG) from the linear gradation (LG), according to the following equation:

$$RMS_{grd} = \sqrt{\left(\sum_{i=1}^{N} \delta_i^2\right)/N}$$

with:

$\delta_i$=deviation of a corrected image value (histogram gradation (HG)) from an uncorrected image value i (linear gradation (LG));

N=plurality of deviations ($\delta_i$).

22. The method of claim 21, comprising the steps of:

calculating statistical histogram parameters of "skewness" (skew) and "Kurtosis" (Kurt) from the aggregate histogram of said critical sub-images:

comparing said calculated statistical histogram parameters to prescribed skewness and Kurtois threshold values, and deriving an RSM value (Rmsi) as a rated value for contrast correction by evaluating results of said comparison according to a classification pattern.

23. The method of claim 22, wherein a correction factor (k) for a contrast correction is formed as a quotient from said derived RMS rated value (Rmsi) and an actual value ($RMS_{grd}$).

24. The method of claim 1 wherein said image values used for analysis of the image gradation of the image original are generated by scanning in a pre-scan the image original with a resolution which is coarser than the resolution normally used for scanning in a fine scanning of the image original for reproduction purposes.

25. The method of claim 1, wherein the input device generates image values in a first color space, and wherein the method comprises the additional steps of:

transforming the image values of the first color space into image values of a second color space that is independent of the first color space; and analyzing the image gradation for calculating setting values based on the transformed image values of the second color space.

26. A method for analysis and correction of image gradation of an image original in apparatus and systems for image processing, comprising the steps of:

geometrically subdividing the image original to be analyzed into a plurality of sub-images;

acquiring image values or color values by point-by-point and line-by-line, optoelectronic scanning of the image original with an input apparatus;

identifying a frequency distribution of the image values or of luminance components of the color values in the corresponding sub-image for every sub-image so as to form a corresponding sub-image histogram;

evaluating the sub-image histograms of the individual sub-images, and identifying the sub-images that are image-critical for the image gradation since they are identified as being high in structure wherein relatively large image value changes occur as compared to other of the sub-images which are lower in structure wherein relatively small image value chances occur;

calculating an aggregate histogram from the sub-image histograms of the image-critical sub-images, said aggregate histogram corresponding to a frequency distribution of the image values or of the luminance components of the color values in the image-critical sub-images; and employing the calculated aggregate histogram for calculating a correction curve (G=f(L)) for contrast correction of the image original.

* * * * *